(12) United States Patent
Yokoyama et al.

(10) Patent No.: US 7,474,949 B2
(45) Date of Patent: Jan. 6, 2009

(54) CONTINUOUSLY VARIABLE TRANSMISSION WITH COOLING STRUCTURE FOR SPEED-CHANGE CONTROL ACTUATOR

(75) Inventors: Taichirou Yokoyama, Kanagawa (JP); Hiroyuki Ochiai, Tokyo (JP); Fuminori Sato, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 481 days.

(21) Appl. No.: 11/189,846

(22) Filed: Jul. 27, 2005

(65) Prior Publication Data

US 2006/0041363 A1 Feb. 23, 2006

(30) Foreign Application Priority Data

Aug. 6, 2004 (JP) ............................. 2004-230751

(51) Int. Cl.
*G06F 17/00* (2006.01)
(52) U.S. Cl. .......................................... 701/51; 701/60
(58) Field of Classification Search ................... 701/51, 701/60, 67; 477/34, 37–39, 50; 475/31
See application file for complete search history.

(56) References Cited

U.S. PATENT DOCUMENTS 6,641,498 B2 * 11/2003 Okuwaki ..................... 475/117
2006/0030453 A1 * 2/2006 Yokoyama et al. ............ 477/37

FOREIGN PATENT DOCUMENTS

JP 2001-260678 A 9/2001

* cited by examiner

*Primary Examiner*—Yonel Beaulieu
(74) *Attorney, Agent, or Firm*—Foley & Lardner LLP (57) ABSTRACT

A continuously variable transmission for an automotive vehicle, including a power train whose speed ratio is variably changeable in accordance with an oil pressure signal from a control valve assembly. A mechanical feedback mechanism is provided including an actuator for speed-change control operable in accordance with an electric signal. The actuator has a solenoid section. A speed-change control valve is provided to control an oil pressure to be supplied to the power train. A speed ratio sensor is provided to be moved in mechanical relation to a part of the power train in accordance with a change in the speed ratio of the power train. A linking member is provided to link the actuator, the speed-change control valve and the speed ratio sensor. Additionally, an oil bath is provided to contain oil in which at least a part of the solenoid section of the actuator is immersed.

7 Claims, 6 Drawing Sheets

FIG.6

CONTINUOUSLY VARIABLE TRANSMISSION WITH COOLING STRUCTURE FOR SPEED-CHANGE CONTROL ACTUATOR

BACKGROUND OF THE INVENTION

1. Field of the Invention

This invention relates to improvements in a continuously variable transmission provided with a mechanical feedback mechanism for speed-change of a vehicle, and more particularly to a cooling structure for an actuator for speed-change control, in the mechanical feedback mechanism.

2. Description of the Prior Art

Hitherto, a variety of mechanical feedback mechanisms to be used for speed-change in a continuously variable transmission in a vehicle have been proposed and put into practical use. One of these mechanical feedback mechanisms is disclosed in Japanese Patent Laid-open Publication No. 2001-260678. In the technique of this publication, the continuously variable transmission is provided with a mechanical feedback mechanism in which a motor for speed-change control, a speed-change control valve and a pulley sensor are linked to each other by a linking member. The linking member is under necessity of linking the pulley sensor located at the side of a power train and the speed-change control valve located within a control valve assembly. Therefore, the motor for speed-change control is disposed to a side surface of the control valve so as to be located under an oil surface or level inside the continuously variable transmission in consideration of assembly efficiency of the mechanical feedback mechanism and a cooling performance to the motor for speed-change control.

However, in the above conventional technique, the motor for speed-change control is limited in arrangement, and therefore it is difficult to ensure the compactness of a transmission unit.

BRIEF SUMMARY OF THE INVENTION

It is, therefore, an object of the present invention to provide an improved continuously variable transmission provided with a cooling structure for a speed-change control actuator, which effectively overcome drawbacks encountered in conventional continuously variable transmission provided with a cooling structure for an actuator for speed-change control of a vehicle.

Another object of the present invention is to provide an improved continuously variable transmission provided with a cooling structure for a speed-change control actuator, which can effectively ensure the compactness of a transmission unit achieving effective cooling for an actuator for speed-change of a vehicle.

A further object of the present invention is to provide an improved continuously variable transmission provided with a cooling structure for a speed-change actuator, in which the actuator is high in freedom in layout.

An aspect of the present invention resides in a continuously variable transmission which comprises a power train whose speed ratio is variably changeable. A control valve assembly is provided to output an oil pressure signal with which the speed ratio of the power train is changeable. A mechanical feedback mechanism is provided including an actuator for speed-change control operable in accordance with an electric signal. The actuator has a solenoid section. A speed-change control valve is provided to control an oil pressure to be supplied to the power train. A speed ratio sensor is provided to be moved in mechanical relation to a part of the power train in accordance with a change in the speed ratio of the power train. A linking member is provided to link the actuator, the speed-change control valve and the speed ratio sensor. Additionally, an oil bath is provided to contain oil in which at least a part of the solenoid section of the actuator is immersed.

DETAILED DESCRIPTION OF THE INVENTION

Figure 1:
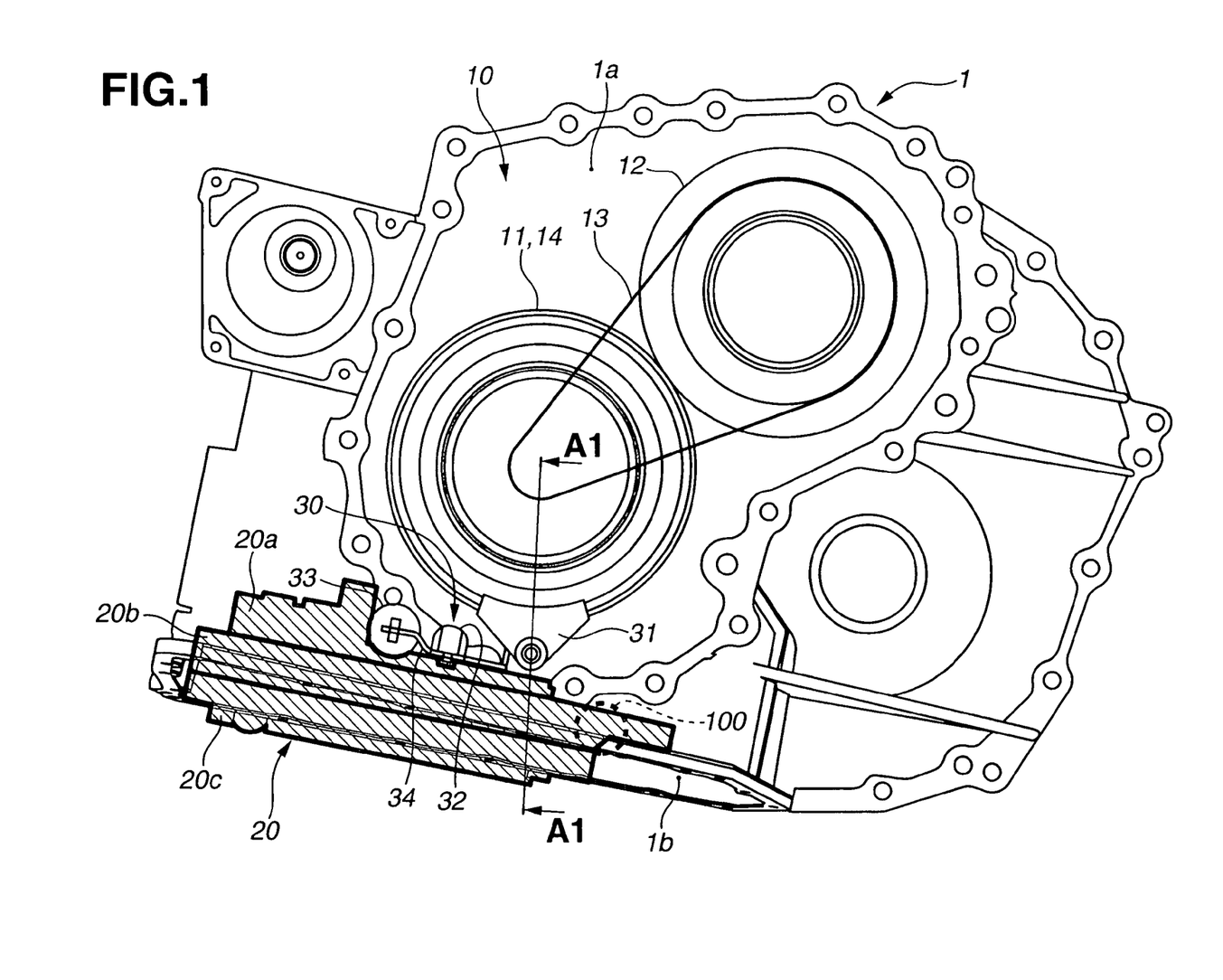
FIG. 1 is a schematic illustration of an embodiment of a belt type continuously variable transmission according to the present invention.

Referring now to FIGS. 1 to 6 of the drawings, an embodiment of a continuously variable transmission is illustrated. A major part of the continuously variable transmission is the same as that of a known belt type continuously variable transmission, as shown in FIG. 1 as a schematic illustration. The continuously variable transmission of this embodiment is for an automotive vehicle and includes a transmission housing 1 which includes a power train accommodating section 1a in which a power train 10 is accommodated, and a valve accommodating section 1b in which a control valve assembly 20 is accommodated. The power train 10 includes the belt type continuously variable transmission mechanism in which a forward/reverse changing mechanism 14 is disposed at the power input side thereof to be able to change forward running and reverse running of the vehicle.

The forward/reverse changing mechanism 14 includes a planetary gear mechanism having a sun gear, a carrier and a ring gear. The sun gear is connected to a side of an engine and has a forward clutch. The carrier is connected to a reverse brake. The ring gear is connected to a primary pulley 11 of the continuously variable transmission and has a forward clutch. The forward clutch functions to engage the sun gear to the ring gear as a one-piece member thereby outputting an input rotation as it is. The reverse brake functions to fix the carrier to the transmission housing 1 thereby decelerating (in reverse rotation) an input rotation to be output. In the forward/reverse changing mechanism 14, other rotational elements may be engaged with each other, and a double pinion type planetary gear sets may be used for the planetary gear mechanism, so that no limitation is made on those.

The continuously variable transmission mechanism includes the primary pulley 11 having a movable sheave 11a and a fixed sheave 11b, and a secondary pulley 12 having a movable sheave and a fixed sheave. The primary pulley 11 is rotated with rotational input from the forward/reverse changing mechanism 14. A belt 13 is passed on a groove formed between the movable sheave and the fixed sheave in each pulley. The belt 13 drivingly connects the primary pulley 11 and the secondary pulley 12. Each pulley is provided with a cylinder chamber located at rear side of the movable sheave. The cylinder chamber is operated by oil pressure applied thereto so as to change the width of the groove of each pulley 11, 12. The oil pressure applied to the cylinder chamber controls a thrust acting in the direction of the rotational axis of the pulleys 11, 12 to press the belt 13. This changes the effective radius of the belt 13 thereby accomplishing a stepless speed changing.

The control valve assembly 20 which generates an oil pressure signal is disposed under the power train 10. A mechanical feedback mechanism 30 is disposed between the control valve assembly 20 and the power train 10. The control valve assembly 20 includes an upper body 20a disposed at the side of the power train 10, and a lower body 20c disposed to the side of an oil pan (not shown). A middle body 20b is disposed between the upper body 20a and the lower body 20c. The upper body 20a is provided on its upper surface with a plurality of electronic components 21 including electromagnetic control valves and various types of sensors such as an oil temperature sensor, an oil pressure sensor or the like. Additionally, a stepper motor 33 is assembled on the upper surface of the upper body 20a. The stepper motor 33 is provided with an oil bath 50 to be cooled by lubricating oil, as will be discussed below. The oil bath 50 contains therein lubricating oil and serves as a cooling mechanism for the stepper motor 33 as an actuator for speed-changing of the vehicle. Additionally, the control valve assembly 20 is also formed with a through-hole 40 whose function will be discussed in detail below. It will be understood that the arrangement of the control valve assembly 20 is not limited to one as discussed above and may be constituted of two sections, i.e., the upper body 20a and the lower body 20c, or constituted of single section or body.

The mechanical feedback mechanism 30 is constituted of a pulley sensor 31 as means for detecting a speed ratio, a speed-change control valve 32 for controlling an oil pressure, and the stepper motor 33 serving as an actuator for speed-changing. A linking member 34 is provided for mechanically linking the pulley sensor 31, the speed-change control valve 32 and the stepper motor 33.

Pulley Sensor

Figure 2:
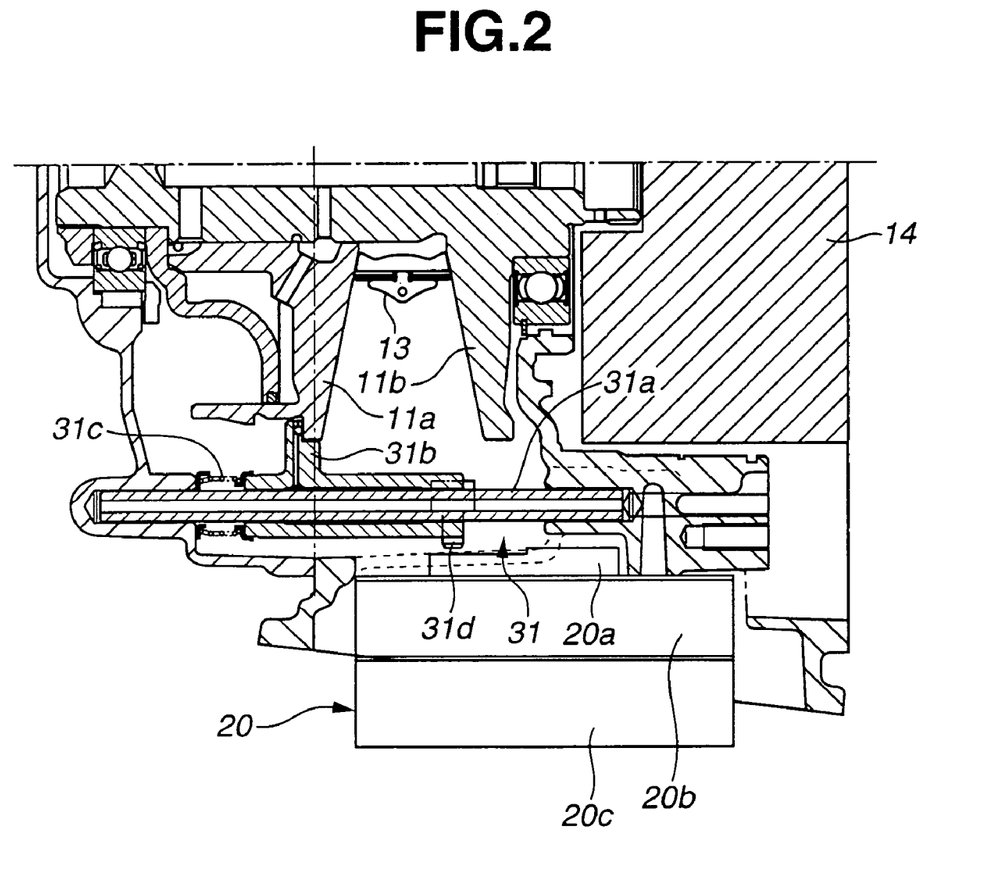
FIG. 2 is a fragmentary enlarged sectional view taken in the direction of the arrows substantially along the line A1-A1 of FIG. 1, showing a primary pulley and a control valve assembly of the transmission.

As shown in FIG. 2, the pulley sensor 31 is disposed at the lower end side of the primary pulley located near the upper body 20a. The pulley sensor 31 includes a sensor shaft 31a which is fixed to the transmission housing 1 and formed therein with an axial oil passage through which lubricating oil is supplied. A sensor main body 31b is movably supported on the sensor shaft 31a as to move in a direction along the axis of the sensor shaft 31a and slidably contacted with outer peripheral side of the movable sheave 11a. A spring 31c is provided to bias the sensor main body 31b to the movable sheave 11a. Additionally, the sensor main body 31b is provided with a linking pin 31d to be linked with the linking member 34.

Speed-Change Control Valve

Figure 3:
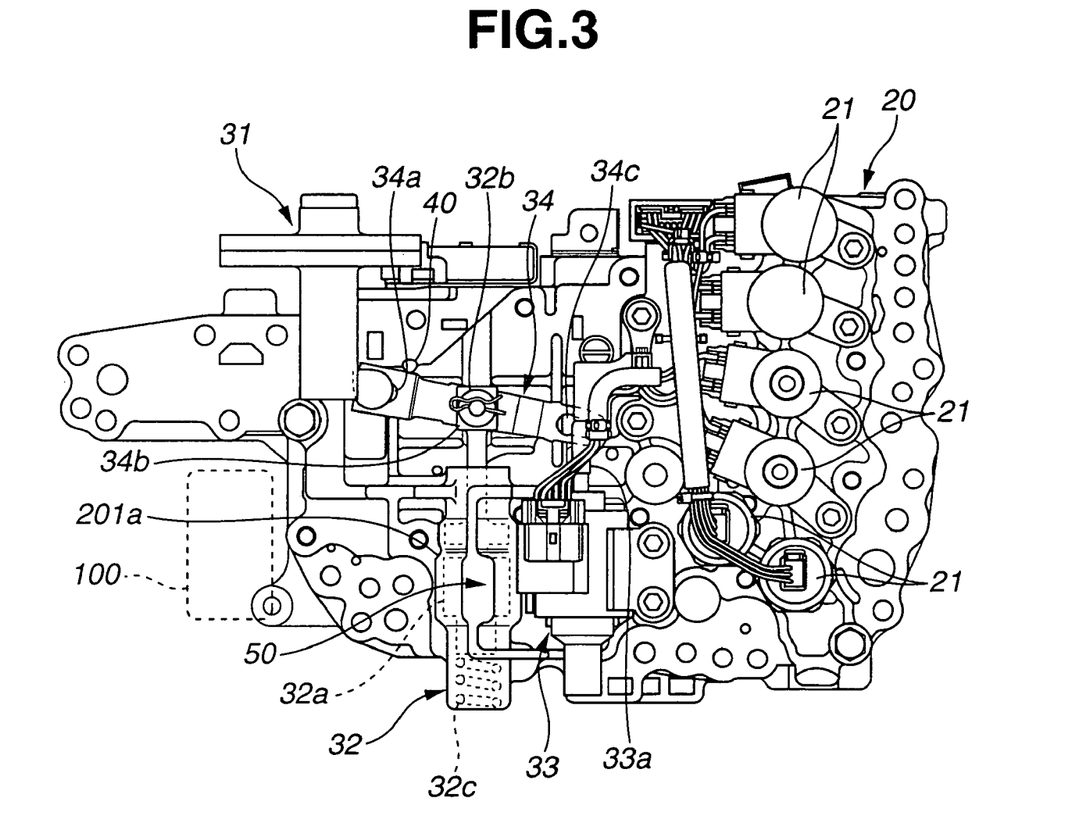
FIG. 3 is a top view of the control valve assembly including a mechanical feedback mechanism of the transmission of FIG. 1.

As shown in FIG. 3, the speed-change control valve 32 is disposed within a speed-change control valve accommodating section 201a which is formed on the upper surface of the upper body 20a facing the power train 10, in such a manner as to project in a semi-cylindrical shape. The speed-change control valve 32 is parallel with a direction in which a drive shaft of the power train 10 extends. Additionally, the speed-change control valve 32 includes a speed-change control section 32a and a linking section 32b. The speed-change control section 32a is also accommodated within the speed-change control valve accommodating section 201a and has a plurality of spools. The linking section 32b is formed projecting from the speed-change control valve accommodating section 201a toward the pulley sensor 31 in the power train drive shaft extending direction. The speed-change control valve accommodating section 201a is provided therein with a spring 32c which biases the speed-change control section 32a toward the linking section 32b.

Stepper Motor

The stepper motor 33 is disposed at the upper surface of the upper body 20a facing the power train 10 and adjacent to the speed-change control valve accommodating section 201a. The stepper motor 33 has a driven shaft 33a which is driven and moved by the number of steps which are in accordance with a speed-change command signal generated by a control unit (not shown). In this embodiment, the speed-change control valve 32 and the stepper motor 33 are assembled in the single body, and therefore an assembly error between the stepper motor 33 and the speed-change control valve 32 is decreased. It will be understood that the stepper motor 33 has a solenoid section inside which a solenoid is disposed to drive the driven shaft 33a of the stepper motor 33.

Linking Member

The linking member 34 is constituted of a sensor linking section 34a, a speed-change control valve linking section 34b and a stepper motor linking section 34c. The sensor linking section 34a is fitted to the linking pin 31d of the pulley sensor 31 to be rotatable on the upper surface of the upper body 20a and to be slidable in a direction along the axis of the linking member 34. The speed-change control valve linking section 34b is rotatably linked with the linking section 32b of the speed-change control valve 32. The stepper motor linking section 34c is fitted to the driven shaft 33a of the stepper motor 33 to be rotatable and slidable in the direction along the axis of the linking member 34.

Speed-Change Control Operation

The driven shaft 33a is moved by the number of steps in a direction along the axis of the driven shaft 33a when the command signal is output. By this, the linking member 34 is driven by the driven shaft 33a and turned around the sensor linking section 34a serving as a supporting point, thereby moving the speed-change control section 32a which is at its neutral position where no oil passage is connected to the speed-change control section 32a. With this movement, the speed-change control section 32a changes the oil passages through which oil flow thereby supplying oil to the cylinder chamber of the primary pulley 10 or the secondary pulley 12. When the speed-change is initiated, the width of the groove between the movable sheave and the fixed sheave is changed so that the pulley sensor 31 is moved in the direction along the axis of the sensor shaft 31a. This movement of the pulley sensor 31 restores the speed-change control section 32a to the neutral position through the linking member 34 linked with the stepper motor 33 as the supporting point thereby terminating the speed-change. That is to say, the transmission according to this embodiment is provided with the mechanical feedback mechanism by which an oil pressure control for the speed-change is automatically terminated when the pulleys reach a speed ratio corresponding to a certain driven amount of the stepper motor 33 upon driving the stepper motor 33 by the certain driven amount.

Locating During Assembly Operation

Next, discussion will be made on assembly of components of the above arrangement. The control valve assembly 20 is formed with the through-hole 40 which pierces all the upper body 20a, the middle body 20b and the lower body 20c, in which a locating pin or the like is insertable in the through-hole from the lower side of the lower body 20*c*. The through-hole 40 is formed at such a position that the outer surface of the linking member 34 is brought into contact with the locating pin or the like inserted in the through-hole 40 when the linking member 34 is placed at a position corresponding to the lowest speed ratio of the transmission mechanism. The locating pin or the like is used for assembling the above arrangement during assembly operation, and is drawn out from the through-hole 40 after the assembly operation.

Effects by Locating

When the stepper motor 33 and the speed-change control valve 32 are connected with the linking member 34, the initial position of the stepper motor 33 is readily settable by setting a projection amount of the driven shaft 33*a*. In contrast, the initial position of the speed-change control valve 32 is difficult to be set since the initial position is at a location which is projected relative to a desired position (neutral position) owing to the fact that the speed-change control section 32*a* of the speed-change control valve 32 is biased by the spring 32*c*. As discussed above, the pulley sensor 31 is installed to the side of the power train 10, while the linking member 34 is installed to the control valve assembly 20 at the side facing the power train 10. Therefore, during the assembly operation, an operator cannot see the sensor linking section 34*a* thereby making it difficult to accurately achieve connecting between the pulley sensor 31 and the linking member 34 if the linking member 34 is not set at an initial position. In this regard, the speed-change control valve 32 and the stepper motor 33 are connected by the linking member 34, and thereafter the locating pin or the like is inserted into the through-hole 40 so as to locate the speed-change control section 32*a* of the speed-change control valve 32 at a position corresponding the neutral position. By this, the speed-change control section 32*a* can be set at the initial position or pushed-back position through the linking member 34 against the biasing force of the spring 32*c*. Thereafter, the locating pin or the like is pulled out from the through-hole 40. As a result, locating of the components of the above mechanical feedback mechanism can be easily accomplished.

Oil Bath

Figure 4:
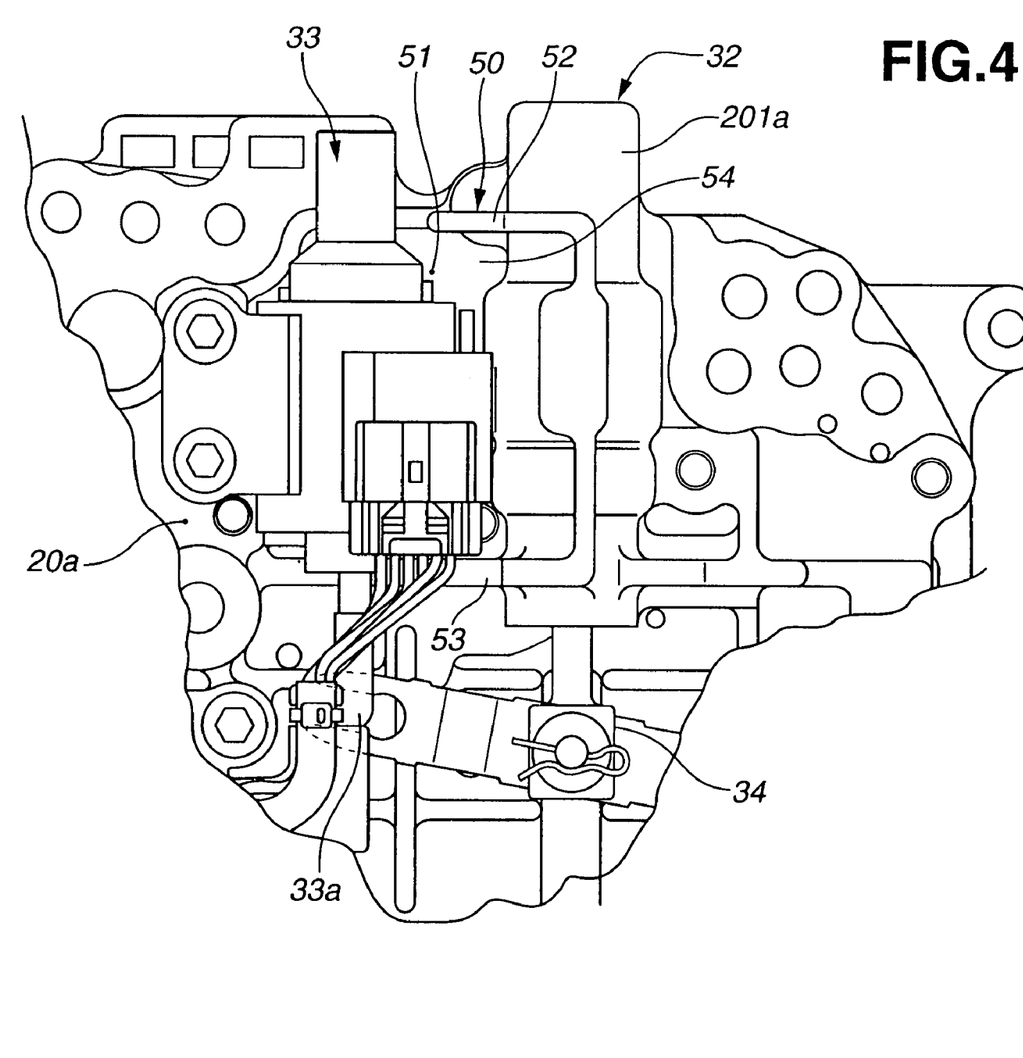
FIG. 4 is a fragmentary enlarged top view showing an area around a stepper motor and a speed-change control valve which area is provided with an oil bath of the transmission of FIG. 1, as viewed from the upper surface of an upper body of the control valve assembly.

Next, discussion will be made on an oil bath 50. As shown in FIG. 4, the oil bath 50 is formed around the speed-change control valve accommodating section 201*a* and the stepper motor 33 so that lubricating oil is stored in the oil bath 50. The oil bath 50 includes a bathtub 51 which is formed in the upper body 20*a* in the shape of generally cylindrical depression so as to wrap a part of the stepper motor 33. An inclined surface 54 is formed to smoothly continuously connect the bathtub 51 and the outside surface of the speed-change control valve accommodating section 201*a* which is formed projected in the semi-cylindrical shape from the upper body 20*a*. Additionally, the oil bath 50 is formed with a first oil catch section 52 which is extended to the side of the stepper motor 33 at the same height as the upper surface of the speed-change control valve accommodating section 201*a*. A second oil catch section 53 is formed extending to the side of the stepper motor 33 at the same height as the upper surface of the speed-change control valve accommodating section 201*a* and is smoothly continuously connected to the top surface of the bathtub 51.

Figure 5:
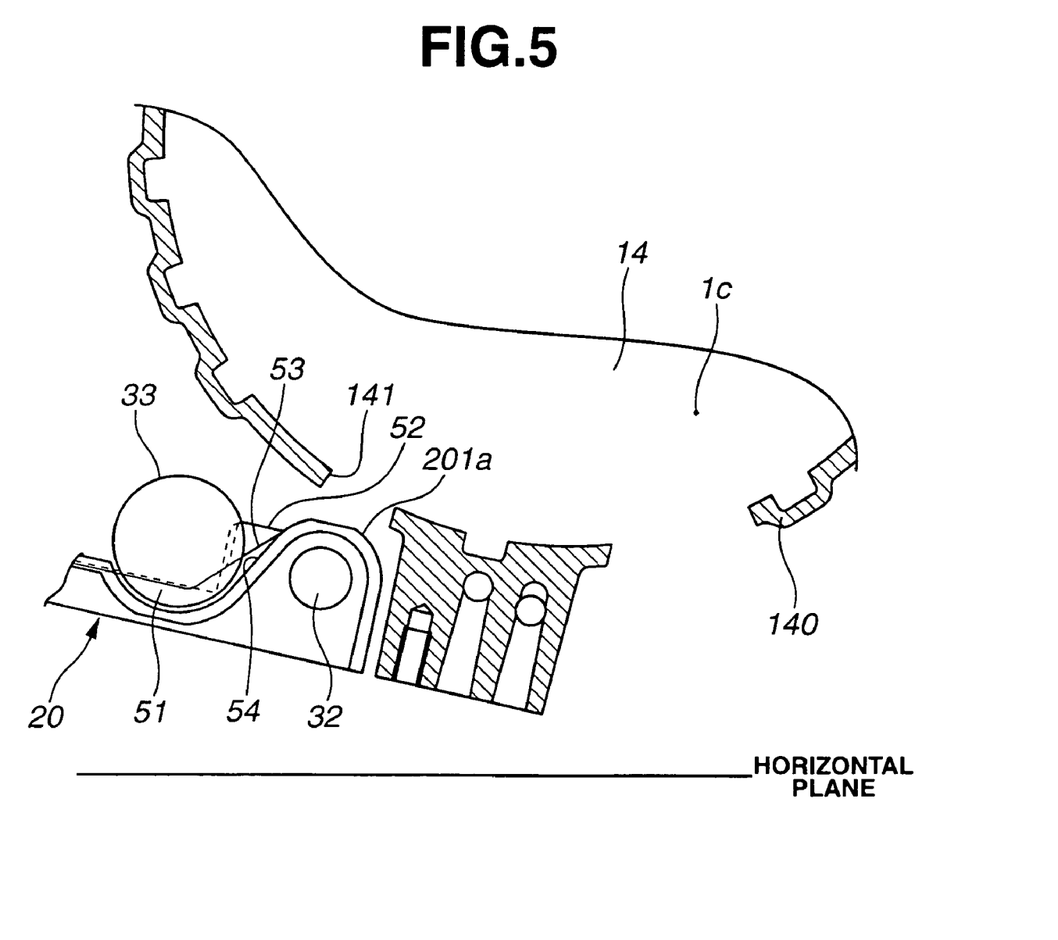
FIG. 5 is a fragmentary sectional view showing the oil bath of FIG. 4.

As shown in FIG. 5, the control valve assembly 20 is assembled to be inclined with respect to a horizontal plane or road surface. The forward/reverse changing mechanism 14 is mounted above the oil bath 50 and includes a frictional engaging element such as the reverse brake (or the forward clutch) which is disposed at the side of the transmission housing 1. A cutout 141 is formed at the lower side of the wall section 140 of the forward/reverse changing mechanism accommodating section 1*c* accommodating the frictional engaging element and is located above the speed-change control valve accommodating section 201*a*. The frictional engaging element is supplied with oil pressure thereby accomplishing its engaging and disengaging actions. During normal forward running of the vehicle, the forward clutch is engaged while the reverse brake is disengaged so that the lubricating oil is supplied to between the plates of the reverse brake for the purpose of reducing a friction loss between a driven plate fixed to the side of the transmission housing 1 and a drive plate fixed to the side of a carrier. The lubricating oil flows through the clearance between the plates to reach the cutout 141 formed at the lower side of the wall section 140, and then is drained through the cutout 141 to an oil pan (not shown).

Figure 6:
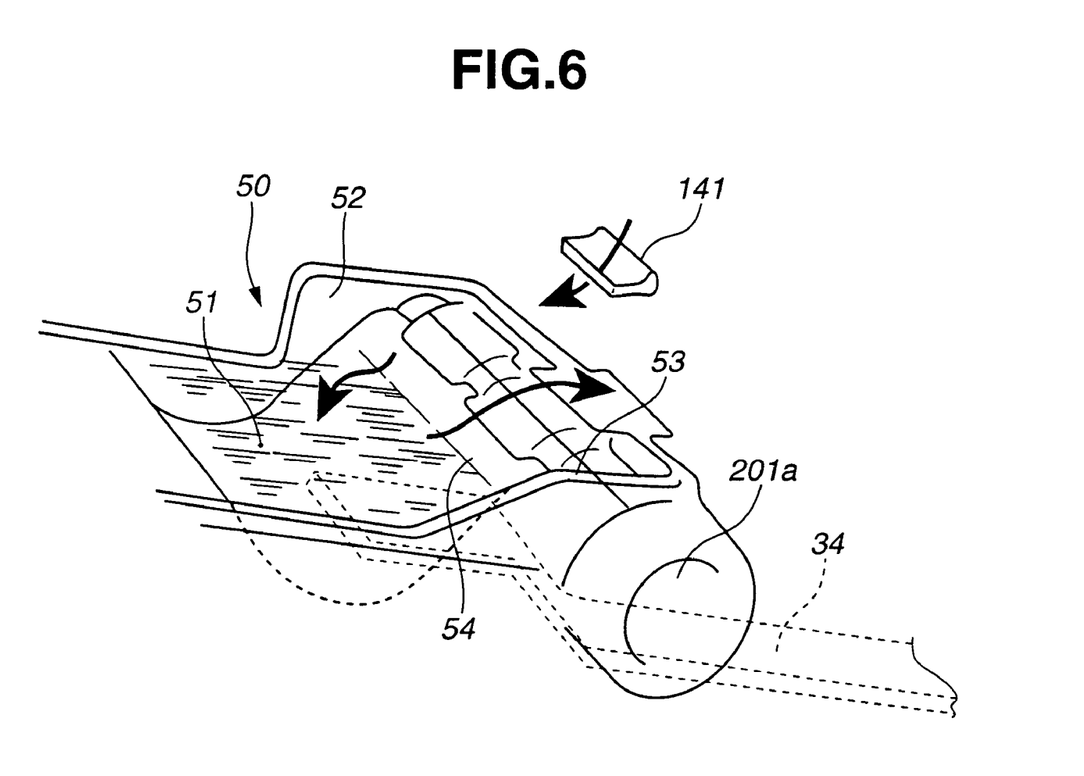
FIG. 6 is a schematic perspective illustration showing flow of oil to the oil bath of FIG. 4.

As shown in FIG. 6, the lubricating oil for the frictional engaging element is supplied through the cutout 141 serving as a lubricating oil supply source and caught by an area including the outer peripheral surface of the speed-change control valve accommodating section 201*a*, the first oil catch section 52 and the second oil catch section 53. Most of lubricating oil is passed through the outer peripheral surface of a solenoid of the stepper motor 33 and stored in the bathtub 51. As discussed above, the control valve assembly 20 is installed to be inclined with respect to the horizontal plane, and therefore the bathtub 51 is located at upper side with respect to the inclined surface. Consequently, the lubricating oil stored in the bathtub 51 cools down the solenoid of the stepper motor 33, and then is flowed along the inclined surface 54 to drop to the lower side. In this connection, in a conventional technique, the stepper motor is disposed at a position lower than the oil surface or level inside a transmission, and therefore a stepper motor can secure a cooling performance; however, freedom in layout is very low. In contrast, in the configuration according to this embodiment, the stepper motor 33 can be disposed to a desired position regardless of the oil surface inside the transmission thereby improving freedom in layout.

Hereinafter, effects in the cooling structure for the stepper motor according to this embodiment will be discussed.

(1) The solenoid of the stepper motor 33 can be securely cooled down regardless of location of the stepper motor 33 because the oil bath 50 is formed such that at least a part of the solenoid section of the stepper motor 33 is immersed therein. This improves freedom in layout thereby achieving improvements in compactness of the transmission.

(2) Oil flowed to the oil bath 50 is supplied from the side of the power train 10, and therefore there is no need to form new passage for oil so that cost can be prevented from increasing.

(3) The oil bath 50 is formed in the control valve assembly 20 and therefore can be formed simultaneously with casting of the control valve assembly 20, so that the cooling mechanism can be prevented from increasing in cost.

(4) At least a part of the oil bath 50 is arranged using the outer peripheral section of the speed-change control valve accommodating section 201*a*. Thus, an inherent arrangement is used so that the oil bath can be formed with the minimum change in design.

(5) The oil bath 50 is constituted of the oil catch sections 52, 53 for guiding oil and the bathtub 51 for storing oil. With this, the lubricating oil can be securely flowed to the solenoid section of the stepper motor 33, and additionally the stepper motor 33 can be securely cooled down by the bathtub 51.

(6) The oil bath 50 is formed at the upper body 20*a*, and therefore supply of oil from the side of the power train 10 can be securely accomplished.

(7) The lubricating oil of the reverse brake is introduced to the oil bath 50. The reverse brake is always supplied with the lubricating oil during forward running of the vehicle so that the oil bath 50 can be supplied with a sufficient amount of lubricating oil. The lubricating oil to be introduced into the oil bath 50 may be one which is supplied to between the contacting surfaces of each pulley and the belt in the power train 10.

(8) The control valve assembly 20 is installed to be inclined with respect to the horizontal plane, and therefore the oil catch sections 52, 53 are formed only at the lower side of the inclined surface. As a result, lubricating oil can be securely introduced to the oil bath 50, and therefore cooling the stepper motor 33 can be accomplished with the minimum change in design.

As appreciated from the above, according to the present invention, the actuator for speed-change control can be improved in freedom in layout thereby securing the compactness of the transmission unit, while being effectively cooled by the oil bath.

The entire contents of Japanese Patent Application P2004-230751 (filed August 6) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A continuously variable transmission, comprising:
a power train whose speed ratio is variably changeable;
a control valve assembly which outputs an oil pressure signal with which the speed ratio of said power train is changeable;
a mechanical feedback mechanism including an actuator for speed-change control, operable in accordance with an electric signal, said actuator having a solenoid section, a speed-change control valve which controls an oil pressure to be supplied to said power train, a speed ratio sensor moved in mechanical relation to a part of said power train in accordance with a change in the speed ratio of said power train, and a linking member for linking said actuator, said speed-change control valve and said speed ratio sensor; and
an oil bath containing oil in which only at least a part of the solenoid section of said actuator is immersed, said oil bath being disposed to said control valve assembly and separate from an oil pan containing oil which is to be supplied into the power train to lubricate parts of the power train.

2. A continuously variable transmission as claimed in claim 1, wherein the oil in said oil bath is supplied from said power train as an oil supply source.

3. A continuously variable transmission as claimed in claim 1, wherein at least a part of said oil bath is formed using the outer peripheral section of a speed-change control valve accommodating section in which said speed-change control valve is accommodated.

4. A continuously variable transmission as claimed in claim 1, wherein said oil bath includes an oil catch section by which oil is guided, and a bathtub in which oil is stored.

5. A continuously variable transmission as claimed in claim 1, wherein said control valve assembly includes at least upper and lower bodies, the upper body being disposed to the side of said power train, the lower body being disposed opposite to the upper body, wherein said oil bath is disposed to the upper body.

6. A continuously variable transmission as claimed in claim 1, wherein said power train includes a forward/reverse changing mechanism for changing forward running and reverse running of a vehicle by engaging and disengaging a frictional engaging element accommodated in a housing, wherein said housing in which the frictional engaging element is accommodated is formed at its lower section with a cutout through which oil is supplied to said oil bath.

7. A continuously variable transmission as claimed in claim 4, wherein said control valve assembly is installed to be inclined with respect to a horizontal plane, wherein said oil bath has an inclined surface, the oil catch section is formed only at the lower end side on the inclined surface.

* * * * *